United States Patent [19]

Liebing

[11] Patent Number: 4,631,398

[45] Date of Patent: Dec. 23, 1986

[54] APPARATUS FOR RECEIVING ELECTROMAGNETIC RADIATION

[75] Inventor: Lothar Liebing, Neuhausen, Fed. Rep. of Germany

[73] Assignee: Deutsche Forschungs- und Versuchsanstalt für Luft- und Raumfahrt e.V., Bonn, Fed. Rep. of Germany

[21] Appl. No.: 776,919

[22] Filed: Sep. 17, 1985

[30] Foreign Application Priority Data

Sep. 18, 1984 [DE] Fed. Rep. of Germany ....... 3434159

[51] Int. Cl.$^4$ ............................................... H01J 3/14
[52] U.S. Cl. ...................................... 250/216; 350/6.6
[58] Field of Search .................. 250/216, 234–236; 350/6.6; 356/141, 152

[56] References Cited

U.S. PATENT DOCUMENTS 4,270,048  5/1981  Liebing ............................. 250/216

OTHER PUBLICATIONS

Moeller et al, "Elektrische Messtechnik" p. 22, 1961, B. G. Teubner Verlagsgesellschaft, Stuttgart, Germany.

Primary Examiner—Eugene R. LaRoche
Assistant Examiner—D. Mis
Attorney, Agent, or Firm—Laubscher & Laubscher

[57] ABSTRACT

Apparatus for receiving electromagnetic radiation at various angles of incidence including an optical element for guiding the radiation upon a radiation detector, and magnetic drive means for adjusting the position of the optical element, characterized by the provision of a shock-resistant suspension for the magnet in the form of a plurality of linear elements in the form of coplanar taut wires or resilient bands that extend radially outwardly from and coplanar with the magnet, together with a plurality of stationary coils arranged circumferentially about the magnet, whereby the magnet can be pivoted about pivot axes, respectively, contained in the plane, and also be displaced in a direction normal to the plane (i.e., in the Z-direction). Means are provided for measuring the Z displacement of the magnet, including a spherical segment secured to a face of the magnet for interrupting, at least partially, a beam of parallel light extending from a source thereof to a surface area type light detector, thereby producing a control signal that is supplied to the drive means for the optical element.

10 Claims, 2 Drawing Figures

APPARATUS FOR RECEIVING ELECTROMAGNETIC RADIATION

BRIEF DESCRIPTION OF PRIOR ART

This invention relates to an apparatus for the reception of electromagnetic radiation which strikes the device at varying angles of incidence and includes a detection element for the radiation, a movable optical element for guiidng the radiation toward the radiation detection element, and drive means for adjusting the position of the optical element, which drive means includes a magnet that is firmly connected with said optical element and that is permanently magnetized in a radial direction. The magnet is arranged within an outer magnetic field which can be generated by magnetic coils that are arranged around the magnet and whose coil axes extend normal to the radial direction of the magnet, said outer magnetic field being so adjustable that the electromagnetic radiation is always guided by the optical element toward the detection element, independently of the angle of incidence of the radiation.

Receiving apparatus of this type is used in order to take bearings on remote objects, for example, satellites, and in order to aim a reception of transmission antenna at these remote objects. This is extremely important if signals are to be exchanged between the remote object and the device, especially in connection with the use of a laser ray which represents a very sharply limited light beam. In known devices of this kind, radiation originating from the object on which a bearing is to be obtained, is guided via a swingable optical element (such as a transmissive guiding member or a reflective mirror) toward a fixed detector and in the process, the position of the optical device during the tracking of the ray is so moved that the incident radiation will hit the fixed detector regardless of the position of the object observed. To achieve this, the detector and the optical element drive, for example, a magnetic drive, are connected with each other by means of a regulating or control circuit. Here, the optical element (mirror or guidance element) is firmly connected with the magnet and is so arranged in an outer magnetic field that the regulation circuit, connected with the detector, will vary the position of the optical element by altering the magnetic field. Small deviations in the radiation absorbed will lead to intensity changes in the detector and these changes are balanced out by means of displacement of the mirror.

In a known device of this kind as evidenced, for example, by my U.S. Pat. No. 4,270,048 of May 26, 1981, the magnet is swingably positioned in a cage around a first rotating axis which cage in turn can be swung around a second rotation axis running normal there. The magnet is permanently magnetized in the radial direction, parallel to a plane in which the first rotation axis lies, and around the magnet there are arranged magnetic coils in a plane, in which the second rotation axis lies, with coil axes running normal to that plane, in such a manner that, by means of the selective energization of the coils, the magnet can, as desired, be pivoted around the first and/or the second rotation axis. This device, with the Cardanic suspension of the magnet, however entailed the disadvantage that it was usable to withstand the rough operating conditions, above all as regards resistance to shock.

Many fields of application, for example, the surveying of bridge pillars which bend due to radiation from the sun, the determination of resonances on buildings and towers, which are caused by the action of the wind, or the recording of shifts in the earth in earthquake regions, presuppose that, in addition to great accuracy in the determination of the angle, at which a radiation travels from such an object to a reference point, there must also be easy transportability and, connected with that, a low degree of sensitivity regarding shocks due to the device.

SUMMARY OF THE INVENTION

A primary object of the invention is to provide an improved apparatus for receiving electromagnetic radiation, wherein on the one hand, the possibility of automatically measuring angles with maximum accuracy is retained while, on the other hand, affording shock-resistant capabilities to facilitate use of the device under rough operating conditions.

In accordance with a more specific object of the invention, the optical element for guiding the electromagnetic radiation to the detector is mounted on a permanent magnet that is supported for displacement relative to the detector by a plurality of coplanar radially-outwardly extending taut wires or resilient bands which define a plurality of pivot axes contained in a common plane and about which the magnet may be caused to selectively pivot, respectively, in combination with z-direction measuring means for determining the linear non-rotational displacement of the magnet in a direction normal to the plane. The z-direction measuring means includes a spherical segment mounted on an end face of the magnet parallel with said plane, a light source with parallel light, and a surface area optical-electrical sensor, whereby the segment is so arranged at the face of the magnet that the sphere center point corresponding to the cup and the center point of the magnet will correspond, and that the light source and the sensor are so arranged in a fixed manner on radially opposite sides of the magnet that a parallel light ray, running normal to the z-direction, and coming from the light source, will illuminate the surface area sensor more or less, depending on how much the segment extends into the light ray, and that the z-position of the magnet can be adjusted independently of its swinging motion by a regulating or control unit whose input signal is formed by the sensor signal and so selectively energizes the magnetic coils that the point of rotation of the magnet will be fixed in the z-direction.

The suspension of the magnet by means of resilient bands makes the magnet very mobile; rigid mechanical parts, which can break in case of shock or impact, are not to be found in this suspension. The disadvantage of the band suspension—the fact that the magnet is fixed in the z-direction only to a minor degree—can be compensated by means of the described electronic z-position regulating unit, whereby bearing forces developing in the z-direction are absorbed to a great extent by the magnetic field.

By using a spherical segment in the ray path of the measurement device for the z-position, the z-position can be determined independently of the rotation of the magnet. To avoid disturbances during the measurement process resulting from changing magnetic fields, the measurement is made optically. It is advantageous if the magnet is of annular configuration.

In a prefered version of the invention it is provided that the magnet is retained by four taut wires or resilient bands, two of which, in each case, form an angle of 90° with respect to each other and that, for the purpose of energizing the outer magnetic field, there are provided four magnetic coils which are arranged at the corners of a square whose diagonals form an angle of 45° with respect to the wires or bands.

It is particularly advantageous if stop members made of resilient material (such as rubber) are arranged around the magnet to prevent the magnet from hitting fixed parts in its surroundings.

The optical element, which is connected with the magnet, can be either a mirror or a transmissive element, such as a parallel plate.

To determine the position of the magnet and the optical element, it is possible to attach on the magnet adjacent the optical element a mirror against which a radiation can be reflected. Preferably this mirror, which is used in determining the position, is an annular mirror. In a particularly preferred version of the invention, the spherical segment for the radiation to be received is transparent to the electromagnetic radiation and is optically opaque as regards the radiation issuing from the light source with parallel light. For example, the cup is transparent for light in the visible spectrum, whereas it does not allow infrared light to pass through; the light source with parallel light then correspondingly emits IR light. Of course, a segment, which allows IR light to pass through and which blocks visible light, is just as practical. Accordingly, a light source with parallel light is necessary here which will emit visible light.

Because, for the optical scanning of the z-position of the magnet, there is used radiation with a wavelength which is missing in the spectrum of the radiation to be received, it is possible to make the optical element used for reception, for example, as a plane-parallel plate and to measure the electromagnetic radiation to be received or its angle of incidence in a transmission mode.

BRIEF DESCRIPTION OF THE DRAWING

Other objects and advantages of the invention will become apparent from a study of the following specification, when viewed in the light of the accompanying drawings, in which.

DETAILED DESCRIPTION

Figure 1:
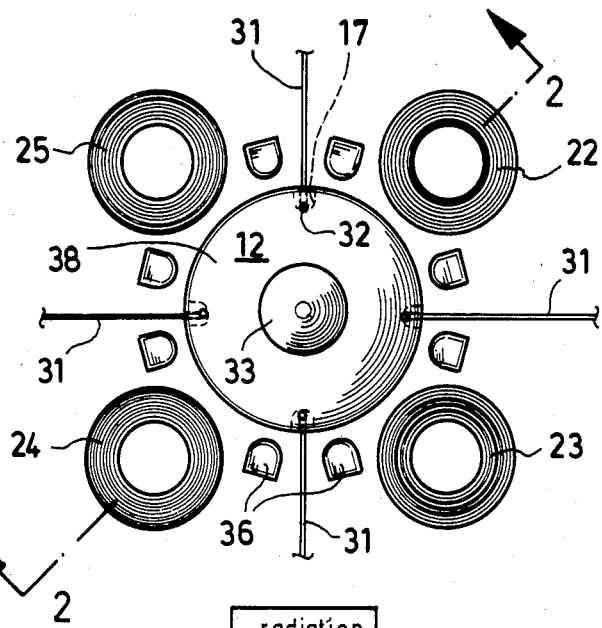
FIG. 1 is a detailed top plan view of the optical drive means of the electromagnetic radiation receiving system.

Referring first more particularly to FIG. 2, the electromagnetic radiation originating from source 2 is directed by optical system 4 upon a swingably mounted optical element 10 which directs the incident electromagnetic radiation toward a radiation detection device 6 via a spherical segment 33, as will be described below. The radiation detector 6 supplies a signal to the optical system drive control means 7 which, as a function of the radiation impact upon the detector, so activates the drive elements for the optical element 10 that the radiation will always strike the detection element 6 in the same manner. The position of the optical element 10 here depends on the angle of incidence of the radiation, that is to say, the position of the optical element is a measure for the angle of incidence.

To be able to fix this position, optical element 10 is rigidly connected with an annular mirror 30, against which a light ray from a fixed light source 8 is reflected. This light ray is reflected in different directions, depending on the position of the optical element 10 and thus the position of the annular mirror 30, so that the direction of reflection can be used directly to indicate by detector and position indicator 9 the position of the optical element 10.

Figure 2:
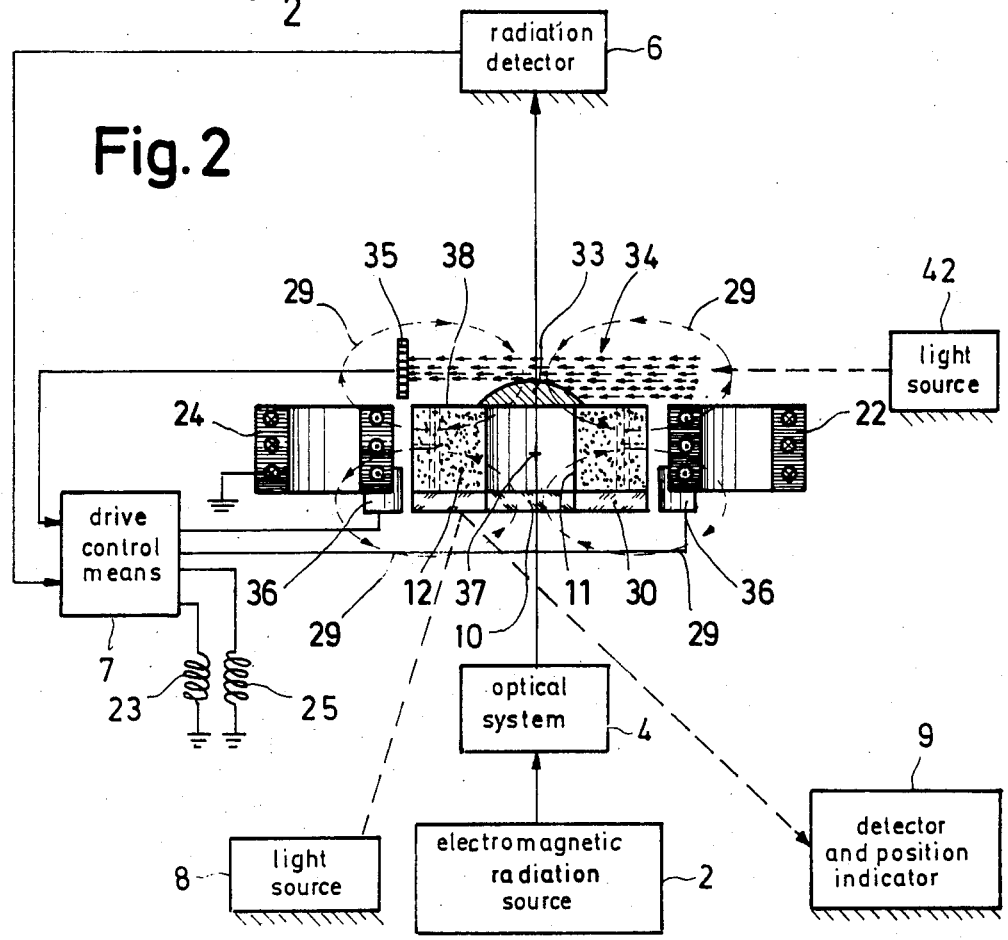
FIG. 2 is a schematic view of the electromagnetic radiation receiving system taken along line 2—2 of FIG. 1.

Referring to FIGS. 1 and 2, a preferred example of the optical element with associated drive will be described. In the example illustrated, the optical element 10 comprises a flat radiation-transmissive element which is mounted in a central opening 11 of an annular permanent magnet 12 which is magnetized radially. The rigid unit, consisting of magnet 12 and the optical element 10, is normally maintained in a plane parallel to the radial direction of the magnet by means of four taut wires or resilient bands 31 and can be swung around any axis located in this plane. Wires or bands 31 are held in recesses 17 at attachment points 32 in the plane of the rotation axes.

As shown in FIG. 1, the annular magnet 12 is surrounded by four magnetic coils 22, 23, 24 and 25, which are so arranged at the corners of a square that the coils will in each case be in the middle between two wires or bands 31. The four coils lie in a common plane with the magnet, the coil axes being normal to this plane. The diagonals of the square which connect coils 22 and 24 or 23 and 25 form an angle of 45° with respect to the wires or bands 31 so that, on the whole, a symmetrical arrangement is produced where wires or bands and magnetic coils alternate along the circumference of the unit.

On the same circumference circle, eight resilient stops 36 are so arranged that they will each be contained between a coil and a neighboring wire or elastic band 31, respectively. The resilient stops are used, in case of a shock, to prevent the magnet from bumping against fixed parts in its surroundings.

The suspension of the magnet on wires or bands offers only a slight degree of fixation of the magnet 12 in the direction normal to the plane of the rotation axes (which hereafter will be called the z-direction). This disadvantage necessitates the electronic regulation of the z-position of the magnet and that requires a measurement device for the z-position. This measurement device comprises a spherical segment 33 which is attached to an end wall 38 of the magnet in such a manner that the sphere center 37, corresponding to cup 33, will agree with the point of pivoting of the magnet 12. The measurement device for the z-position of the magnet 12 furthermore comprises a second light source 42 and a sensor 35, both of which are so arranged in a fixed manner on radially opposite sides of the magnet that a parallel light ray 34 from the light source, running normal to the z-direction, will illuminate the surface area sensor 35 to a greater or lesser degree, depending on how much the segment 33 extends into the light ray. As a function of the sensor signal, coils 22–25 are loaded by a corresponding current, whereby the current flows through each coil in the same direction, resulting in a force upon the magnet in the z-direction.

During the operation of the device according to the invention, the coils are so energized that, in the area of the annular magnet, a field will develop which leads to the swinging of the magnet 12. By suitably energizing the coils, one can cause the annular magnet to be swung around any desired rotation axis by any desired amount. The coils are controlled via a special circuit which, in the manner described, is so controlled by the radiation detection element 6 that the incident radiation, which is transmitted by the optical element 10, will always hit the detection element in the same way. The current, which is given off by the z-position regulating circuit is responsive to the degree of radiation of sensor 35 added to the current that is supplied to the coils in order to swing the magnet.

To be able to determine the particular position of the annular magnet and thus the position of the optical element, the annular magnet carries an annular mirror 30, which is hit in the manner described previously by a light ray source 8 with a constant direction of incidence and which is reflected at different angles, depending upon the position of the magnet.

Using the drive of an optical element, according to the invention, it is possible to determine angle changes in the incident radiation ray in two mutually perpendicular planes with maximum accuracy. Because of the magnetic, contactless drive of the optical element, there are practically no friction forces so that one can even perform a very fine swing of the optical element with great precision.

The return moment—which appears due to the taut wires or the resilient bands 31 during the swinging of the magnet—can be regulated electronically.

In the embodiment of FIG. 2, the incident electromagnetic radiation originating from a source below the magnet assembly is transmitted via optical element 10 and segment 33 onto a detector 6 arranged on the opposite side of the magnet assembly. The optical element may be a plane-parallel plate, or a mirror.

The light source 42 may emit visible light, the spherical segment 33 being transparent for light in the infrared spectrum, and opaque for visible light. alternatively, the source 42 might emit parallel infrared light, whereupon the spherical segment 33 would be transparent for light in the visible spectrum and opaque for IR light. The elements 10 and 33 may be formed from glass or suitable synthetic plastic material.

What is claimed is:

1. Apparatus for receiving electromagnetic radiation energy having varying angles of incidence and including an optical element (10) movable to continuously direct the radiation energy upon a detector (6), comprising
   (a) an optical element (10) arranged to receive the electromagnetic radiation energy;
   (b) shock-resistant means supporting said optical element for movement relative to said radiation detector, including
      (1) a permanent magnet (12) upon which said optical element is mounted; and
      (2) a plurality of coplanar diametrically-arranged circumferentially-spaced linear elements (31) each connected at one end with said magnet, said linear elements extending radially outwardly for connection at their remote ends with fixed locations relative to said radiation detector, said linear elements normally supporting said magnet in a first plane for pivotal movement about pivot axes positioned in said first plane, said linear elements also supporting said magnet for displacement in a direction normal to said first plane;
   (c) drive means for adjusting the position of said optical element relative to the radiation detector, said drive means including a plurality of selectively energizable coils (22-25) arranged circumferentially about said magnet adjacent the electromagnetic field thereof, the axes of said coils being normal to said magnet plane;
   (d) means for controlling said drive means as a function of the displacement of the magnet from its first position in a direction normal to said magnet plane, including
      (1) a spherical segment (33) secured to a face of said magnet parallel with said first plane, the central point of generation (37) of said segment being coincident with the center point of said magnet; and
      (2) a light source (42) and a light detector (35) mounted in fixed relation relative to said radiation detector adjacent said magnet end face in diametrically opposite relation relative to said segment, said light source producing light rays (34) that extend parallel with said end face for at least partial interruption by said spherical segment when said magnet is in said first position;
      (3) said light detector being operable to supply to said drive means a control signal that is a function of the magnitude of the light rays received thereby.

2. Apparatus as defined in claim 1, wherein said magnet is annular, said spherical segment being secured to an end face of said magnet across the central opening contained therein.

3. Apparatus as defined in claim 2, wherein two pairs of said linear members are provided that are orthogonally arranged to cause successive members to be arranged at an angle of 90°, and further wherein four of said coils are provided that are arranged within the spaces between successive linear elements with the diagonals of the square forming an angle of 45° with respect to said linear members.

4. Apparatus as defined in claim 4, and further including a plurality of fixed resilient stops (36) arranged in spaced relation about said magnet for preventing engagement thereby with said coils.

5. Apparatus as defined in claim 2, wherein said optical element (10) is a mirror.

6. Apparatus as defined in claim 2, and further including a mirror (30) connected with said magnet adjacent said optical element, means including a light source (8) for directing light energy upon said mirror, and position indicating means (9) responsive to the light reflected by the mirror for determining the position of said magnet relative to said first position.

7. Apparatus as defined in claim 6, wherein said mirror (30) is annular, said optical element (10) being arranged concentrically within said mirror.

8. Apparatus as defined in claim 7, wherein said spherical segment (33) is transparent relative to the electromagnetic radiation, and is opaque relative to the light produced by the associated light source (42).

9. Apparatus as defined in claim 8, wherein the spherical segment (33) is transparent for light in the visible spectrum and is opaque for infrared light, and further wherein the associated light source (34) emits parallel infrared light energy.

10. Apparatus as defined in claim 8, wherein the spherical segment (33) is transparent for light in the IR spectrum and is opaque for visible light, and further wherein the associated light source emits parallel visible light energy.

* * * * *